United States Patent [19]

Rao et al.

[11] Patent Number: 4,562,695
[45] Date of Patent: Jan. 7, 1986

[54] PARTICULATE TRAP SYSTEM FOR ENGINE EXHAUST USING ELECTRICALLY POWERED REGENERATION

[75] Inventors: Vemulapalli Durga N. Rao, Bloomfield Township, Hartford County; Wallace R. Wade, Farmington Hills; Michael G. Aimone, Westland, all of Mich.

[73] Assignee: Ford Motor Company, Dearborn, Mich.

[21] Appl. No.: 598,552
[22] PCT Filed: Dec. 27, 1983
[86] PCT No.: PCT/US83/02044
§ 371 Date: Dec. 27, 1983
§ 102(e) Date: Dec. 27, 1983
[87] PCT Pub. No.: WO85/02882
PCT Pub. Date: Jul. 4, 1985

[51] Int. Cl.[4] .................................................. F01N 3/02
[52] U.S. Cl. ........................................ 60/286; 60/288; 60/303; 60/311
[58] Field of Search ................. 60/274, 286, 288, 303, 60/311; 55/282, 283, 466, DIG. 10, DIG. 30

[56] References Cited
U.S. PATENT DOCUMENTS
3,723,070 3/1973 Houdry .................................. 60/300
4,281,512 8/1981 Mills ..................................... 60/286
4,404,795 9/1983 Oishi ............................. 55/DIG. 30
4,427,418 1/1984 Kogiso .................................. 55/523
4,450,682 5/1984 Sato ............................. 55/DIG. 10

FOREIGN PATENT DOCUMENTS
57-212316 12/1982 Japan ................................... 60/286

Primary Examiner—Douglas Hart
Attorney, Agent, or Firm—Joseph W. Malleck; Roger L. May

[57] ABSTRACT

An apparatus is disclosed which is operative to remove oxidizable particulates from the exhaust gas of an engine. It has a particulate filter trap disposed in a stream of exhaust gases from the engine, and has electrically heated elements effective, when at least a portion of the stream of exhaust gases is displaced with a fluid medium for transfering heat between the elements and the collected particulates, to promote oxidation of the particulates collected in the filter trap. The electrically heated elements are supplied with energy generated by an alternator driven by the engine; the elements are first heated to an incineration temperature for the particulates in the absence of gas flow, and heating of the elements is continued in the presence of a flow of an oxygen carrying heat transfer medium to promote complete oxidation of the particulates.

17 Claims, 7 Drawing Figures

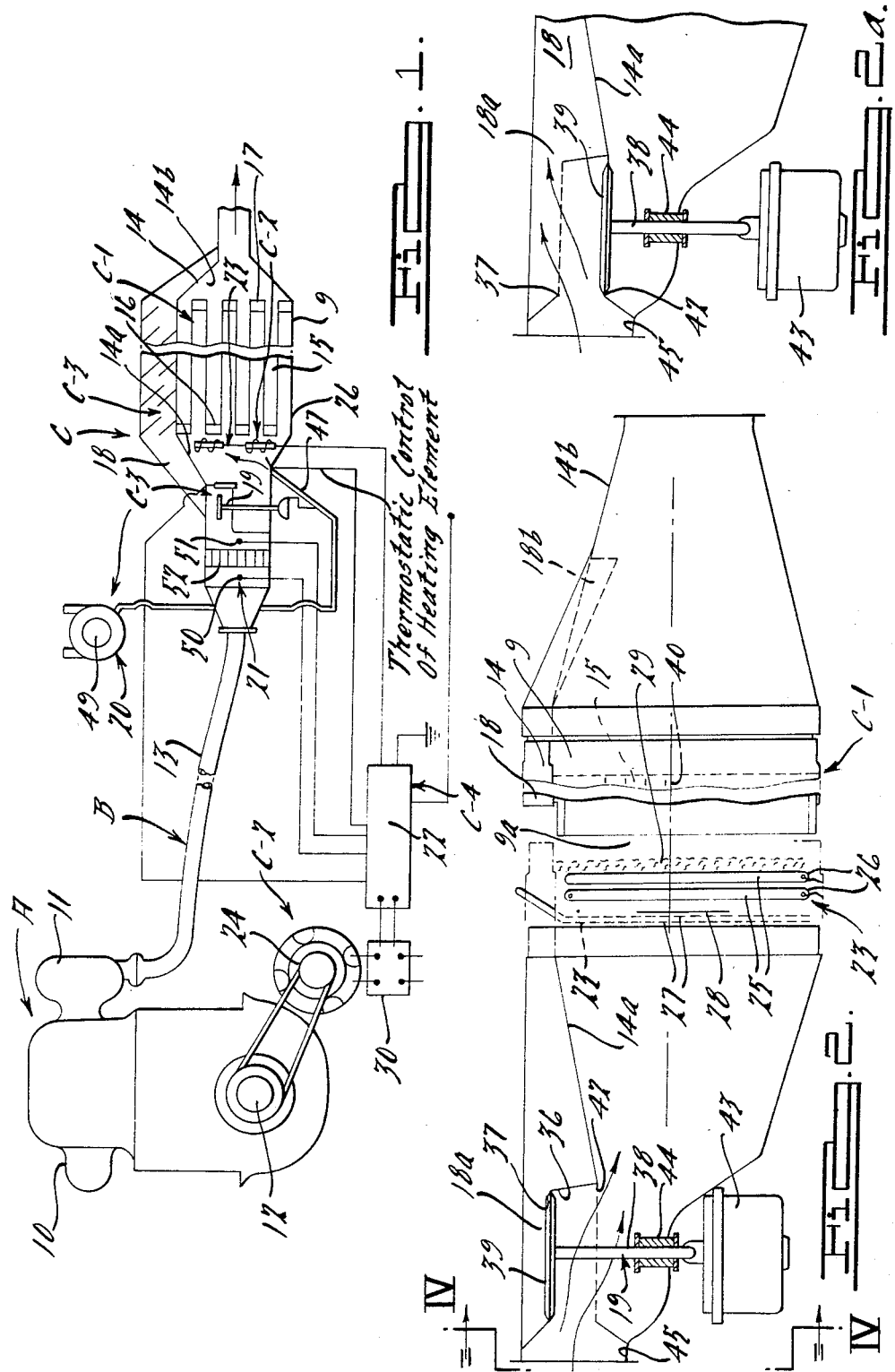

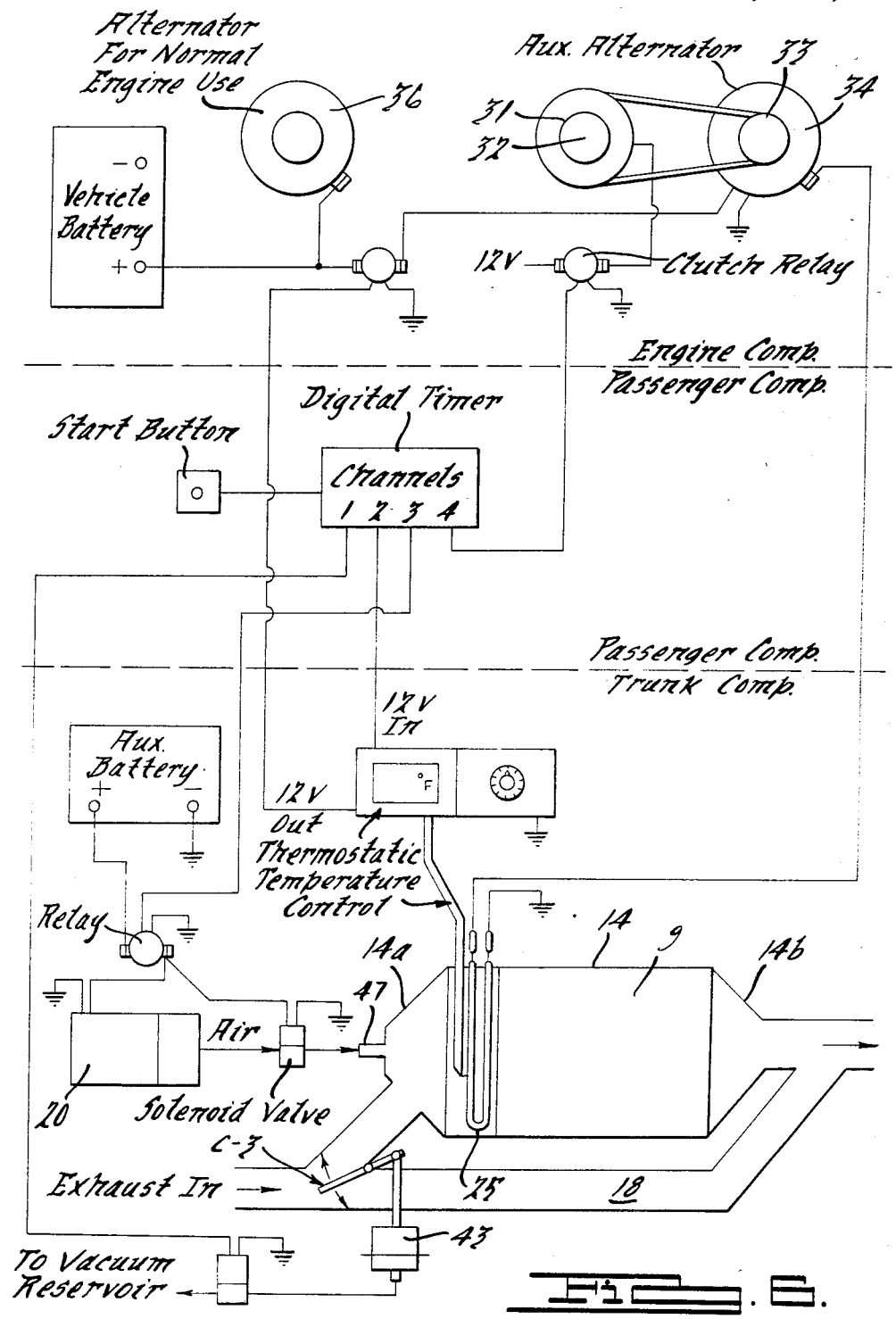

PARTICULATE TRAP SYSTEM FOR ENGINE EXHAUST USING ELECTRICALLY POWERED REGENERATION

TECHNICAL FIELD

The invention relates to the technology of periodically oxidizing particulates collected from the exhaust gases of an internal combustion engine.

BACKGROUND OF THE INVENTION AND PRIOR ART STATEMENT

Particulate emissions from an engine can be reduced with a particulate filter trap and a regeneration system to periodically clean the filter trap of particulates by incineration. Generally, durable and acceptable filters for particulate traps have been developed by the art which have included wire mesh (see U.S. Pat. No. 3,499,269) and, more advantageously, rigid ceramics preferably in a monolithic honeycomb cellular wall structure (see U.S. Pat. Nos. 4,276,071; 4,329,162; and 4,340,403).

Systems of regeneration, developed by the state of the art using filters may now be categorized as: (a) electrical heating, (b) hydrocarbon fuel fed burners, (c) catalyst impregnated traps, and (d) engine throttling. Regeneration systems (b) through (d) have undesirable aspects associated therewith. With fuel fed burners, complex hardware is required, which affects reliability and safety (see U.S. Pat. No. 4,167,852 and Japanese Pat. No. 55-19934). With known catalyst impregnated traps, there is increased sulphate formation, less than desirable durability, generation of unnecessary unburned hydrocarbons and CO, and hardware complexity. With engine throttling, regeneration cannot be carried at low vehicle speeds and light loads (see U.S. Pat. Nos. 4,211,675 and 3,499,269).

Regeneration by electrical heating is advantageous because it offers reliability and simplicity. It can be carried out under any vehicle operating condition, with a minimum increase in fuel economy without affecting emissions content at the outlet of the automotive exhaust system (see U.S. Pat. Nos. 4,270,936; 4,276,066; and 4,319,896). However, the electrical heating regeneration systems to date have not proven successful because they have required an inordinate amount of electrical energy to raise the temperature of the particulates to a level where ignition takes place, such requirement being beyond the on-board capabilities of the vehicle.

What is needed is a regeneration system for a filter trap that (a) is electrically powered but requires a much reduced on-board power supply, and (b) achieves quicker, more efficient regeneration of a particulate laden trap.

SUMMARY OF THE INVENTION

The invention is an improved apparatus for removing oxidizable particulates from the exhaust gases of an automotive engine. The apparatus provides for an alternator generated supply of electrical energy with increased wattage that heats electrical elements in the absence of a fluid flow to promote particulate ignition conditions. The apparatus comprises (1) a particulate filter trap disposed in a stream of exhaust gases from the automotive engine, (2) electrically heated elements in close proximity to the filter trap and in the fluid flow area to promote oxidation of the particulates collected in the filter trap, (3) alternator means for converting the motion of the engine to a supply of electrical energy connectable to the electrically heated elements and effective to heat the elements to at least the incineration temperature of the particulates while the engine is at an idle condition, (4) electrically actuated means for diverting the stream of exhaust gases away from at least a portion of the filter trap and for admitting a flow of a fluid medium effective to transfer heat between the elements and the particulates and to supply oxygen for supporting oxidation of the particulates, and (5) control means for (i) selectively connecting the supply of energy to the elements while energizing the electrically actuated means to divert exhaust gases from at least a portion of the filter trap, and (ii) further actuating the actuating means to admit the flow of fluid medium to the filter trap portion when the elements have been substantially heated to the incineration temperature.

Preferably, the alternator means generates a supply of energy to heat the elements to an incineration temperature in no greater than seven minutes. Preferably, the alternator means has a switching mechanism effective to continuously alternate the connection of the supply of electrical energy with different portions of the elements, the alternation providing a pulsed energization of the elements. The pulsing may advantageously be for sequential periods of 2-4 seconds on and 5-7 seconds off. Preferably, the alternator means comprises a dual function alternator driven by the engine, one of the functions being used to additionally supply electrical energy to the electrically heated elements during the oxidizing cycle. The additional supply of electrical energy provides 2800-3300 watts to the elements when said engine speed is 800-4000 rpm, the current being 40-80 volts at 25-30 amps.

Preferably, the electrically heated elements comprise a plurality of resistance members connected in parallel, which extend across the flow of the fluid medium and are stationed in close proximity to the front face of the filter trap. Advantageously, the resistance members are arranged in a close, spaced relationship to occupy about 50% of the cross-sectional flow area of the fluid medium.

The apparatus for carrying out the displacing function preferably comprises a bypass channel extending around the filter trap and having a flow diverter valve operative to connect at least a portion of the stream of exhaust flow with the bypass channel. The apparatus further comprises air pump means for driving an oxygen carrying fluid medium through the electrically heated elements, after the elements have been heated to an incineration temperature, to transfer heat between the elements and particulates. Alternatively, the flow diverter valve may be effective to divert a flow of the exhaust gas away from only one section of the filter trap while guiding a flow of the fluid medium through the heated elements and through such section of the filter trap.

The control means is effective to control the timed sequence of the energization of the electrically heated elements and electrically actuated means in the following sequence: first, the flow diverter valve is actuated substantially simultaneously with the energization of the alternator means and substantially immediately after the initiation of the oxidizing cycle; secondly, the air pump means is actuated after the heated elements attain a stabilized surface temperature of about 1400° F.; thirdly, the alternator means is deenergized after a predetermined lapse of time, e.g., two minutes; and fourthly, the air pump means is shut off and the diverter valve deactivated at substantially the completion of the full oxidizing cycle time or when the oxidation of the particulates is self-sustaining.

In another particular aspect, the invention is a method of oxidizing particulates collected in a filter trap disposed in a stream of exhaust gases from an internal combustion engine. The method uses an electrical power supply generated by the output member of the engine, and comprises: (a) diverting at least a portion of the stream of exhaust gases from a preselected zone of the filter trap containing the particulates; (b) heating, by use of said power supply, a resistance element located adjacent the particulates in the absence of gas flow, the heating being to the incineration temperature of the particulates; and (c) directing a flow of an oxygen carrying heat transfer medium through the zone while continuing the heating of the resistance element, said medium being heated by said resistance element to convectively and radiantly heat the particulates in the preselected zone of the filter trap to an oxidation temperature.

SUMMARY OF THE DRAWINGS

FIG. 1 is a schematic illustration of a diesel engine and exhaust flow, including the improved apparatus embodying the principles of this invention;

FIG. 2 is an enlarged central sectional view of the filter trap, flow control, and members useful in oxidizing the particulate collection;

FIG. 2a is a partial view similar to FIG. 2 illustrating another operative position of the diverting valve;

FIG. 6 is a schematic circuit diagram for the elements of the apparatus of this invention.

BEST MODE FOR CARRYING OUT THE INVENTION

Figure 3:
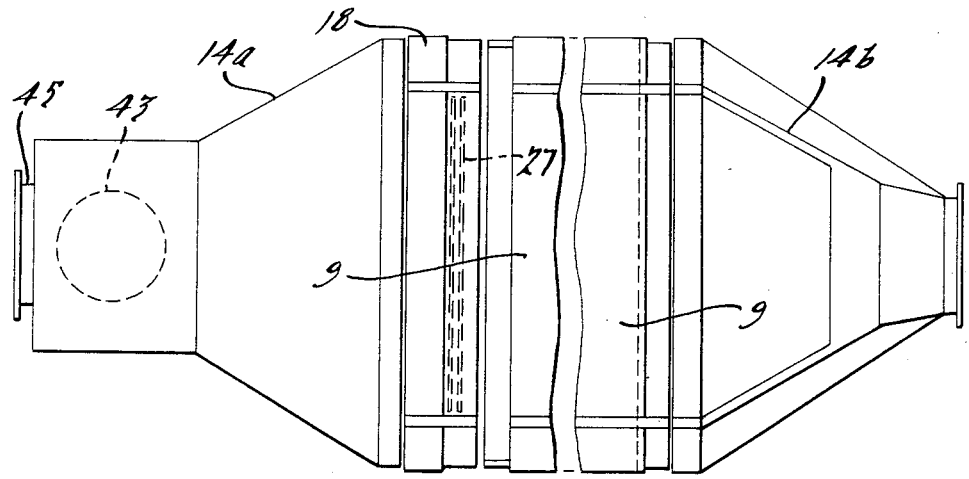
FIG. 3 is a top view of the apparatus of FIG. 2.
Figure 4:
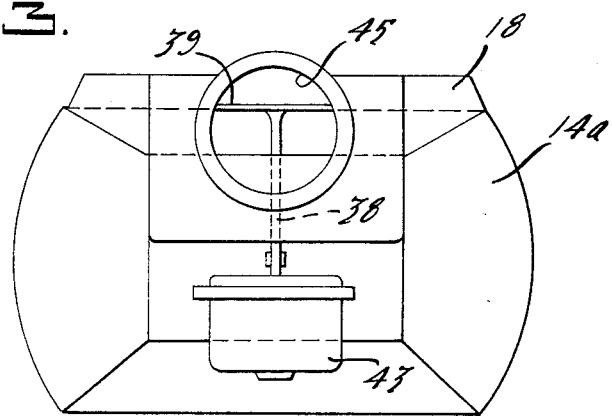
FIG. 4 is an end view taken substantially along the line 4—4 of FIG. 2.

The apparatus of this invention utilizes an unregulated supply of electrical energy, generated by alternator means driven by an automotive internal combustion engine, to heat resistance elements located adjacent the particulate collection in the filter trap. The initial heating is carried out in the absence of any gas flow until the resistance element reaches the incineration temperature of the particulates. Heating thereafter is continued in the presence of a flow of an oxygen carrying heat transfer medium to oxidize the particulates. The heating is pulsed to further reduce the level of electrical energy needed to carry out oxidation.

Turning to FIG. 1, the apparatus, with which this invention is associated, comprises a diesel engine A having intake and exhaust manifolds 10 and 11, along with a driven output member 12. The stream of exhaust gases B is carried from the exhaust manifold 11 of the engine by an exhaust channel 13 leading away from the engine. The filtration system apparatus C is interposed in the exhaust channel 13 and includes a filter trap C-1, a heating means C-2, a means C-3 for displacing the flow of exhaust gases with another fluid medium during an oxidation cycle of the particulates in the filter trap (the latter including a bypass channel 18, a diverting valve 19, and an air pump means 20). It further includes an electrical control means C-4 (broadly including means 21 for initiating the oxidizing cycle and an electronic timer 22 for regulating the sequence of electrically actuated events).

Filter Trap

The filter trap C-1 is a monolithic ceramic honeycomb celled structure 9 supported and contained in a metallic housing 14, the front portion of the housing 14a guiding the flow of exhaust gases through the front face 9a of the monolith, and the trailing portion 14b of the housing guiding the flow of exhaust gases from the filter trap. The monolithic ceramic honeycomb celled structure may be similar to that used for catalytic conversion of gases from a gasoline engine. The monolithic structure contains parallel aligned open channels 15 constituting the honeycomb celled structure; the ends of the channels are alternately blocked with high temperature ceramic cement at the front 16 and the rear 17 so that all of the inlet flow gas must pass through the porous side walls of the channel before exiting from the filter trap. This type of monolithic ceramic structure provides very high filtration surface area per unit of volume. For example, a 119 cubic inch filter trap of this type with 100 cells per square inch and 0.017 inch wall thickness will provide approximately 1970 square inches of filtering surface area, and the filtering surface area per unit volume for such a filter trap would be about 16.6 square inches per cubic inch. The channels are all preferably aligned with the direction of the flow; when the particulates collect on the trap, they will nest within the porosity of the walls which are spaced along the direction of flow. Thus, there can be a general uniform distribution of particulate collections along the length of the trap. Preferably, the monolithic structure has an oval cross-section with a large frontal face 9a of 24–33 square inches; the axes of the oval preferably have a dimension of 4–5 inches and 7–8 inches, respectively.

Heating Means

The heating means C-2, as best illustrated in FIG. 2, has a heater element assembly 23 comprising heating elements 25, here being two layers of continuous sheathed stainless steel nichrome resistor elements, the elements being configured in a spiral fashion much in the fashion of heating coils for a surface heating unit of a stove. The heating elements may be of the resistance type with 2.4 ohm resistance requiring about 45 volts and an electrical input of at least about 850 watts. The heating elements have terminals 26 for connection to a power supply extending through the housing.

The element assembly 23 also comprises plates 27 which function as gas flow diffusers and heat reflectors. Two or three of the plates 27 may be placed in close spaced relationship, each being perforated (containing punched holes of a size of about 0.062–0.125 inch), so that the plates present a screen or grid effect with at least 40% open area. The plates are aligned with each other so that the holes do not present a clear line of sight through all of the plates in an axial direction of the filter trap. The diffuser plates are placed upstream of the heater elements within a distance of about 0.1–0.75 inch.

An airflow mask or disc 28 is interposed between the plates 27 and the heating elements 25 to guide the heat transfer medium gas to a peripheral location along the outer rim of the filter front face 9a. Thus, when the transfer medium flow is sufficiently heated, ignition of the oxidizable particulates will take place substantially along the outer radial region and thence proceed both axially and radially inward as migration of the flame front proceeds through the particulate collection. The airflow mask blocks off approximately 50% of the filter frontal area, which will be at the central region of the oval.

The element assembly further comprises a catalyzed wire mesh 29 located as a woven blanket, with at least 70% open flow area, immediately downstream of the heater elements 25; the mesh has a strand thickness of about 3-5 mils. The catalyst coating on the wire mesh may be a low sulphate active catalyst such as fine particulate plutonium or plutonium and Rh. The catalyzed wire mesh functions primarily to conduct heat uniformly from the heater element to the face of the filter trap and also to lower the temperature required to incinerate or ignite the particulates, thereby minimizing power requirements and lowering energy consumption to provide more uniform heating. Secondarily, the mesh functions to collect hydrocarbon soot during the exhaust gas filtration cycle, which soot is easily lighted and serves to ignite the particulates in the trap.

Figure 5:
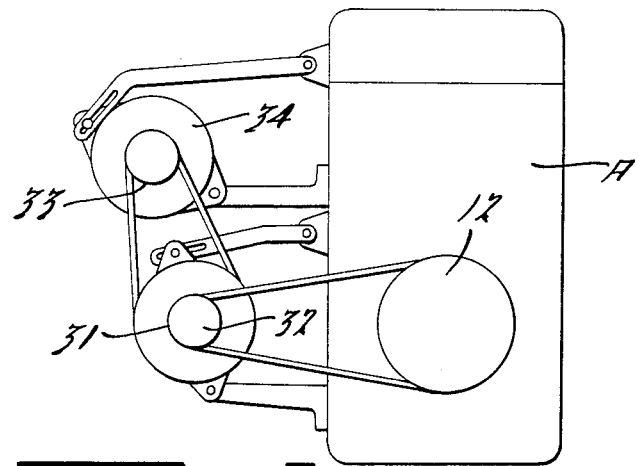
FIG. 5 is an elevational view of one arrangement of an alternator means on the engine, the alternator means being used to power the heating elements necessary to carry out the oxidation cycle.

The alternator 24 may be the primary engine alternator with adequate power output to operate all the vehicle systems during the oxidation cycle of the filter trap. The alternator may have dual functions, or there may be an auxiliary alternator 34 which is driven by an idler pulley and selective clutch actuation. If the alternator is the primary engine alternator (as shown in FIG. 1), a switching mechanism 30 is necessary to move the alternator to a higher function of operation during the time that it is needed for both regneration as well as for continued engine use. Alternatively, as shown in FIGS. 5 and 6, an idler pulley 31 is employed which has an electric clutch 32 selectively actuated to engage the idler pulley 31 for driving another pulley 33 serving as the input to an auxiliary alternator 34. With this arrangement, the pulleys provide a step up in mechanical motion between the output member of the engine and the output of the auxiliary alternator of about 1:5. The alternator should be sized to provide an electrical output for the oxidizing cycle of at least 2800-3300 watts when the engine is operating at 800-4000 rpm, equivalent to a high idle condition for the diesel engine. This will provide an electrical energy supply of 40-80 volts at 25-30 amps.

A switching mechanism, incorporated as part of the control box 22, provides for pulsing of the electrical energy supply to the heater elements. With pulsing, the electrical energy requirements will be at an adequate level of 1200-1600 watts at engine speeds of 800-1700 rpm, with 22-30 amps at 60-70 volts.

Flow Displacing Means

The flow displacing means C-3 particularly has bypass channel 18 defined as a sheet metal casing surrounding the upper portion of the filter trap housing 14, the inlet 18a to the bypass channel 18 being defined by a valve guide seat member 36 which may be of a cast material. The member has a valve seat opening 37 in a plane aligned with the longitudinal axis 40 of the filter mechanism. The outlet 18b of the bypass channel merges again with the exhaust gas channel downstream of the filter trap. The displacing means further comprises a diverting valve 19 constituted here as a poppet, but may alternatively be a flapper type valve. The stem 38 of the poppet valve extends transversely across the axis 40 of the filter trap, and the valve head 39 is normally biased to close off the valve seat opening 37, as shown in upward position of FIG. 2. The exhaust gases thus may flow through the valve seat opening 42 which is in communication with the interior volume of the filter trap. The diverting valve head is actuated to a downward position against the bias by a vacuum motor 43; the motor is contained exterior to the filter trap housing with the valve stem extending through a guide 44 in the wall of housing 14. When the vacuum motor is actuated to overcome the bias and urge the diverting valve in a downward direction, the poppet valve will move to a lower position closing off the valve seat opening 42 and eliminate communication with the interior of the filter trap, thus providing for gaseous communication between the inlet 45 and the bypass channel 18.

When the vacuum motor is in an energized condition, and after the electrical resistance elements have reached a surface temperature of about 1400° F., the air pump means 20 is electrically actuated to convey an oxygen carrying heat transfer medium, here being air, through a passage 47 into the front portion 14a of the filter trap housing, as a replacement for the exhaust gas flow which had been earlier diverted around the filter trap. The air pump of means 20 should be of a size adequate to provide a low flow rate through the filter trap in the range of 4-6 cfm.

Electrical Control Means

The electrical control means C-4 has the initiator 21 preferably comprised of pressure drop sensors 50 and 51. Sensor 51 is located to sense the back pressure immediately upstream of the front of the filter trap device which correlates with the degree of particulate collection in the filter. Another pressure drop sensor 50 is placed in or adjacent to an open channel ceramic honeycomb structure 52 located considerably upstream from the filter itself; the latter contains a porosity which is much larger than that of the filter trap itself so that if any of the particulates become entrapped within the open channel honeycomb ceramic, they will cause little or no pressure drop. The pressure sensor 50, located in this honeycomb structure, will sense a pressure simulating a clean filter trap. The sensors are each of a capacitance type with a measurable voltage output that is a function of the sensed back pressure. (See U.S. application Ser. No. 620,044, now U.S. Pat. No. 4,538,411, by the same inventors herein, the disclosure of which is incorporated herein to facilitate an understanding of the initiator 21.) The voltage output is conveyed to an electronic comparator device in the control box 22. The two voltage signals are ratioed in the comparator device; when the ratio exceeds a predetermined set maximum, a signal is then relayed to initiate the entire regeneration or oxidizing cycle. Monitoring the reference pressure drop across the open channel ceramic honeycomb structure 52 will provide a signal proportional to the clean trap pressure drop for the instantaneous exhaust flow rate. Dividing the actual trap pressure drop by a constant multiplied by the reference pressure drop will provide an electrical signal proportional to the trap loading, which is independent of engine speed, engine load, and exhaust temperature. Thus, when the trap loading is greater than the allowable limit, an electrical signal will be provided to initiate the regeneration process.

The control box 22 has an electronic timer which, when it receives the signal from the comparator, will actuate several timed electrical events in sequence. The timed events include: (a) displacement of the stream of exhaust gases by the heat transfer medium in two separated stages (this is particularly carried out by first energizing the vacuum motor to actuate the bypass valve, and secondly, after a time delay until the resistance elements have reached an incineration temperature, energizing the air pump means to convey a low flow rate of air); (b) energizing the alternator means to provide a supply of electrical energy to the heating elements; and (c) deenergizing and cessation of the above events. Preferably, the timed sequence is as follows: (1) the bypass valve is energized substantially simultaneously with the energization of the resistance elements by the alternator means; (2) after the resistance elements reach a surface temperature of 1400° F., the air pump motor is actuated to transmit a supply of air to the filter chamber (typically this may occur after a time lapse of about 2½ minutes); (3) deenergizing the alternator means at about one-half of the total oxidizing cycle time; and (4) cessation of the air pump means and deactivation of the diverter valve at the completion of the oxidizing cycle time (typically being approximately eight minutes). The cycle time may be selected to be complete when the particulate collection reach a self-sustaining oxidation condition. A circuit diagram for carrying out the above time events is shown in FIG. 6 for exemplification.

We claim:

1. An apparatus for removing oxidizable particulates from a stream of exhaust gases from an automotive engine having a driven output member, comprising:
   (a) a particulate filter trap disposed in said stream;
   (b) electrically heated elements proximate to said filter to promote oxidation of particulates collected in said filter;
   (c) alternator means for converting the motion of said engine driven output member to a supply of electrical energy connectable to said elements and effective to heat said elements to at least the incineration temperature of said particulates while said engine is at least at an idle condition;
   (d) electrically actuated means for diverting said stream of exhaust gases away from at least a portion of said filter trap and for delayedly admitting a flow of a fluid medium effective to transfer heat between said elements and collected particulates and to supply oxygen for supporting oxidation of said particulates; and
   (e) control means for (i) selectively connecting said supply of energy to said elements while energizing said electrically actuated means to divert exhaust gas from at least a portion of said filter trap, and (ii) further actuating said actuating means to admit said flow of fluid medium to said filter trap portion when said elements have been substantially heated to said incineration temperature.

2. The apparatus as in claim 1, in which said alternator means generates a supply of electrical energy effective to heat said elements to an incineration temperature of said particulates in no greater than seven minutes.

3. The apparatus as in claim 1, in which said incineration temperature is about 1100° F.

4. The apparatus as in claim 1, in which said alternator means includes a switching mechanism effective to continuously alternate the connection of said supply of electrical energy with a different portion of said electrically heated elements, said alternation providing for a pulsed energization of said electrically heated elements.

5. The apparatus as in claim 4, in which said pulsed energization provides for connection of the electrical energy supply to said elements for a period of about 2-4 seconds, followed by a period of disconnection for a period of about 5-7 seconds, with continued repetition of substantially the same sequence during heating of the electrical elements.

6. The apparatus as in claim 1, in which said alternator means is comprised of an alternator effective to provide a supply of electrical energy of 2800-3300 watts when said engine speed is 800-4000 rpm.

7. The apparatus as in claim 6, in which said supply of energy has a voltage in the range of 40-80 volts and a current of 25-30 amps.

8. The apparatus as in claim 1, in which said electrically actuated means for carrying out a displacing function comprises (a) a bypass channel extending around said filter trap and a flow diverter valve operative to connect at least a portion of said stream of exhaust gases with said bypass channel, and (b) air pump means for driving a flow of said fluid medium through said electrically heated elements and filter trap from which said exhaust gases have been diverted.

9. A power supply system for an automotive apparatus having a particulate filter trap disposed in a stream of exhaust gases from an automotive engine, said engine having a driven output member and said apparatus having electrically heated elements to promote oxidation of the particulates collected in the filter trap, said apparatus having electrically actuated means for displacing at least a portion of said stream of exhaust gases with a fluid medium for supplying oxygen and for transfering heat between said elements and collected particulates, said system comprising:
   (a) an alternator means for converting the motion of said engine driven output member to a supply of electrical energy connectable to said electrically heated elements, said supply of energy being effective to heat said elements to at least the incineration temperature of said particulates in the absence of gas flow while said engine is at least at an idle condition; and
   (b) an electrical control means for initiating an oxidizing cycle of the particulates in said filter trap and for controlling the timed sequence of events of said initiated cycle, including the energization of said electrically heated elements and energization of said electrically actuated means to divert exhaust gas away from at least a portion of the particulate collection and to delay admittance of said fluid medium into said particulate collection portion until said heated elements have attained a temperature of at least 1400° F.

10. The system as in claim 9, in which said alternator means generates a supply of electrical energy effective to heat said elements to an incineration temperature of said particulates in no greater than seven minutes.

11. The system of claim 9, in which said alternator means is comprised of a dual stage alternator driven by said engine, one of said stages being used to additionally supply electrical energy to said electrically heated elements during the oxidation cycle, said additional supply of electrical energy providing 2800-3300 watts when said engine speed is 800-4000 rpm.

12. The system as in claim 11, in which said supply of electrical energy has a voltage of 40–80 volts and a current of 25–30 amps.

13. The system as in claim 9, in which said alternator means comprises an auxiliary alternator and an idler pulley selectively driven by the output member of said engine to drive said auxiliary alternator, said idler pulley providing for a step up in speed ratio of about 1:2 to 1:5, said auxiliary alternator, when driven, providing for a supply of electrical energy to the elements in the range of 2800–3300 watts when the engine speed is 800–4000 rpm.

14. The system as in claim 9, in which said apparatus for carrying out said displacing function comprises (a) a bypass channel extending around said filter trap and a flow diverter valve operative to connect at least a portion of said stream of exhaust gases with said bypass channel, and (b) air pump means for driving a flow of said fluid medium through said electrically heated elements and filter trap.

15. The system as in claim 14, in which said control means is effective to control the timed sequence of the energization of said electrically heated elements and electrically actuated means in the following sequence: first, said flow diverter valve is actuated substantially simultaneously with the energization of said alternator means and substantially immediately after the initiation of said oxidizing cycle; secondly, said air pump means is actuated after said heating elements attain a stabilized temperature of 1400° F.; thirdly, said alternator means is deenergized after about 50% of the oxidizing cycle time has elapsed; and fourthly, cessation of said blower means and deactivation of said diverter valve is carried out at substantially the completion of the full oxidizing cycle time.

16. The system as in claim 9, in which said electrically heated elements comprise a plurality of resistance members connected in parallel and extending across the flow of said fluid medium.

17. The system as in claim 9, in which said alternator means is comprised of a switching mechanism effective to continuously alternate the connection of said supply of electrical energy with different portions of said electrically heated elements, said alternation providing for a pulsed energization of said electrically heated elements.

* * * * *